(12) United States Patent
Basenberg, Jr. et al.

(10) Patent No.: US 8,032,980 B2
(45) Date of Patent: Oct. 11, 2011

(54) HARNESS FOR BACKPACK BLOWER

(75) Inventors: Mark Hunter Basenberg, Jr., Phoenix, AZ (US); Benjamin Edwin Vierck, Phoenix, AZ (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 12/452,520

(22) PCT Filed: Mar. 26, 2008

(86) PCT No.: PCT/US2008/003919
§ 371 (c)(1),
(2), (4) Date: May 10, 2010

(87) PCT Pub. No.: WO2009/008917
PCT Pub. Date: Jan. 15, 2009

(65) Prior Publication Data
US 2010/0252594 A1    Oct. 7, 2010

Related U.S. Application Data

(60) Provisional application No. 60/958,917, filed on Jul. 10, 2007.

(51) Int. Cl.
*A47L 5/24* (2006.01)
(52) U.S. Cl. ......................................... 15/327.5; 15/344
(58) Field of Classification Search ................... 5/327.5, 5/327.6, 327.2, 405, 344; 15/327.5, 327.6, 15/327.2, 405, 344
See application file for complete search history.

(56) References Cited

U.S. PATENT DOCUMENTS

| | | | |
|---|---|---|---|
| 3,957,184 A | 5/1976 | Shurman | |
| 5,178,312 A | 1/1993 | Iida | |
| 5,813,088 A | 9/1998 | Wagner et al. | |
| 6,047,668 A | 4/2000 | Yamamoto et al. | |
| 6,305,048 B1 | 10/2001 | Salisian | |
| 6,575,695 B1 * | 6/2003 | Miyamoto | 415/119 |
| 7,055,213 B2 | 6/2006 | Iida et al. | |
| 7,300,484 B2 * | 11/2007 | Scully et al. | 55/385.1 |
| 7,437,796 B2 * | 10/2008 | Rappin | 15/327.5 |
| 2004/0216262 A1 | 11/2004 | Taomo et al. | |
| 2006/0005346 A1 * | 1/2006 | Rupp et al. | 15/327.5 |
| 2009/0139248 A1 * | 6/2009 | Crumlin et al. | 62/62 |

FOREIGN PATENT DOCUMENTS

| | | |
|---|---|---|
| DE | 19920346 A1 | 11/2000 |
| EP | 1577302 A2 | 9/2005 |
| GB | 1008015 | 10/1965 |
| WO | WO2004084672 A1 | 10/2004 |

* cited by examiner

*Primary Examiner* — Dung Van Nguyen
(74) *Attorney, Agent, or Firm* — Wegman, Hessler & Vanderburg

(57) ABSTRACT

A power tool (10) includes a power tool housing (18) at least partially-encompassing an internal combustion engine (14) and a harness (12) on which the power tool housing is mounted. The harness has a pair of shoulder straps (16), a waist strap (24), and a panel (44) connecting the shoulder' straps and waist strap. The power tool housing is mounted on a frame (30) having at least one arcuate tool-supporting member with an upper end proximate the shoulder straps and a lower end proximate the waist strap. The tool-supporting member is shaped along its vertical length such that a middle portion of the member arcs away from the panel such that there is an air-circulation space (S) between the power tool housing and the panel. In one embodiment, the power tool is a blower and the housing has an air intake port (46) facing the air-circulation space.

6 Claims, 4 Drawing Sheets

HARNESS FOR BACKPACK BLOWER

CROSS REFERENCE TO RELATED APPLICATION

This application claims the priority benefit of U.S. Provisional Patent Application Ser. No. 60/958,917 filed Jul. 10, 2007.

BACKGROUND OF THE INVENTION

1. Field of Invention

This invention relates generally to the field of lawn and garden tools and, more particularly, to a backpack mounted power tool with a harness that spaces the power tool apart from the operator.

2. Description of Related Art

Yard tools, such as blowers, brush cutters, chemical spreaders and other tools powered by small air-cooled internal combustion engines, are popular among professional grounds keepers as well as the common homeowner. As these tools can be heavy and bulky, it has been known to mount various components of the tool on a backpack frame so that the tool is carried on the back of an operator during work. For example, backpack blowers have been used in lawn and garden applications to enable an operator to direct a stream of high velocity air toward one or more objects to propel the objects along the ground. Such backpack blowers are capable of developing flow velocities and flow volumes greater than the capabilities of ordinary hand-held blowers.

One noticeable problem with many conventional backpack frames for power tools is they are bulky and uncomfortable to wear. Typical backpack-type frames are generally formed from a pipe material and have an L-shape with a pedestal that projects rearwardly to carry the tool. The heavy weight of the tool and the frame itself is a burden on the operator and makes it difficult for the operator to extend and move while using the tool. Additionally, the frame typically maintains the internal combustion engine in close proximity to the back of the operator. This increases the heat felt by the operator and can lead to discomfort.

SUMMARY OF THE INVENTION

The invention is directed to an improved backpack-type power tool configured to be carried on the back of an operator. The power tool includes a power tool housing at least partially encompassing an internal combustion engine and a harness on which the power tool housing is mounted. The harness has a pair of shoulder straps, a waist strap, and a panel connecting the shoulder straps and waist strap. The power tool housing is mounted on a frame having at least one arcuate tool-supporting member with an upper end proximate the shoulder straps and a lower end proximate the waist strap. The tool-supporting member is shaped along its vertical length such that a middle portion of the member arcs away from the panel such that there is an air-circulation space between the power tool housing and the panel. Desirably, the panel is a mesh fabric material. In one embodiment, the power tool is a blower and the housing has an air intake port facing the air-circulation space. This blower tool has two elongate tool-supporting members, namely an upper cross member and a lower cross member, and the air intake port is positioned such that it takes a suction between the two tool-supporting members.

These and other features and advantages of this invention are described in, or are apparent from, the following detailed description of various exemplary embodiments of the systems and methods according to this invention.

BRIEF DESCRIPTION OF THE DRAWINGS

The structure, operation, and advantages of the presently disclosed embodiment of the invention will become apparent when consideration of the following description taken in conjunction with the accompanying drawings wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
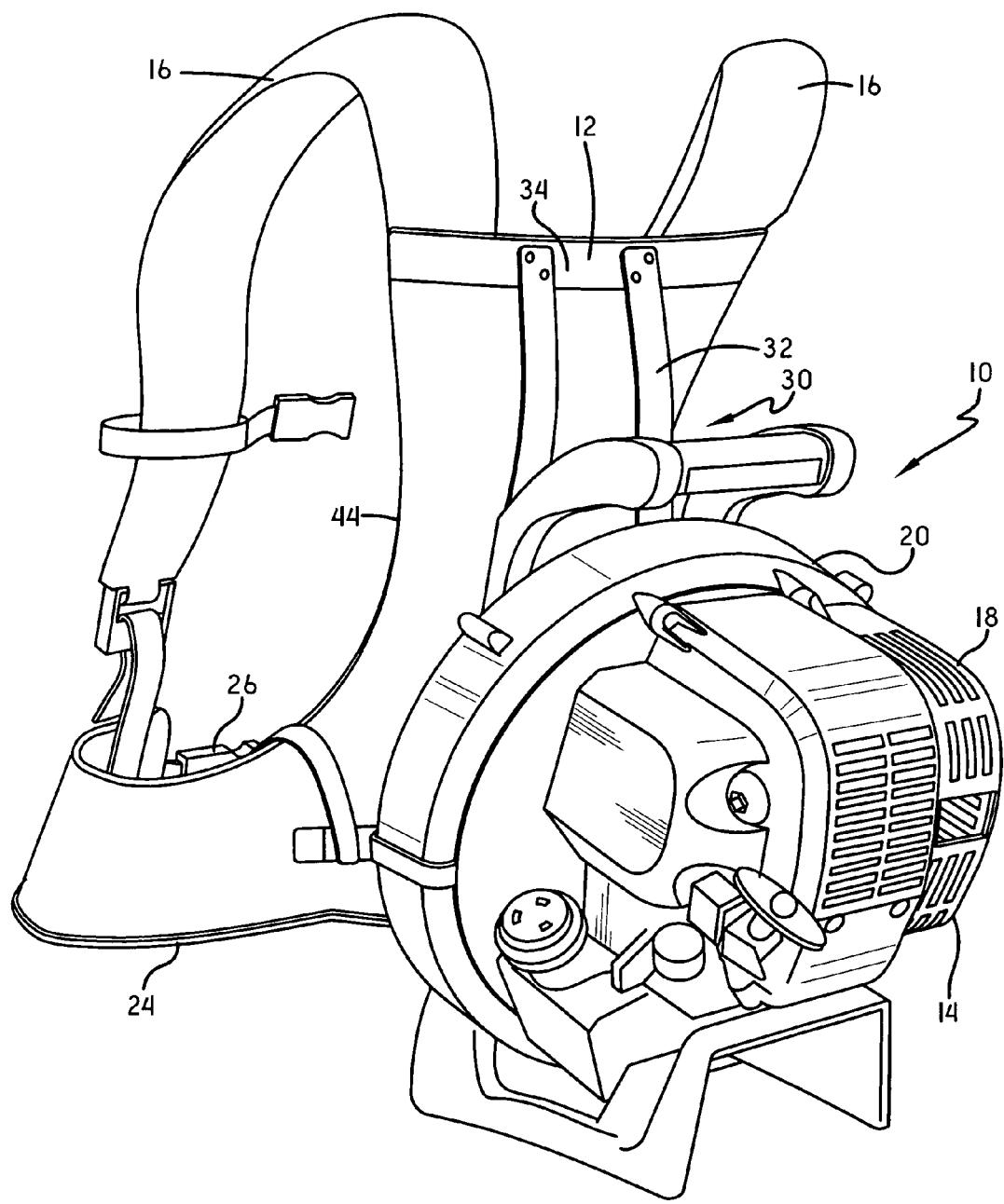
FIG. 1 is a perspective view of a backpack mounted power tool.

Turning now to the Figures, FIG. 1 illustrates a backpack-mounted power tool 10 equipped with a harness 12 and an internal-combustion engine 14. The harness 12 has left and right shoulder straps 16 that enable the power tool 10 to be carried on the back of the operator. The internal combustion engine 14 may be a conventional air cooled two-stroke or four-stroke engine disposed within a housing 18 and provides a power source for the tool 10. In the illustrated embodiment, the power tool 10 is a centrifugal-type blower suitable for blowing fallen leaves, debris or the like. However, one skilled in the art will understand that the power tool 10 may be another back-pack mounted, engine-driven tool such as a brush cutter, line trimmer, chemical spreader or similar tool without departing from the scope of the invention.

As is known in the art, a centrifugal impeller (not shown) of the blower 10 is operationally connected to an output shaft (not shown) of the internal-combustion engine 14, and is rotationally driven by the rotation of internal-combustion engine 14. Air from around the housing 18 is sucked into a volute case 20 formed in the housing 18 through an air intake port by the rotation of the centrifugal impeller. The air is then discharged from an air discharging hose (not shown) in a high-speed airflow. As engine-driven centrifugal blowers are known in the art, additional specifics of the engine and volute related components of the blower 10 need not be described herein in additional detail.

Figure 2:
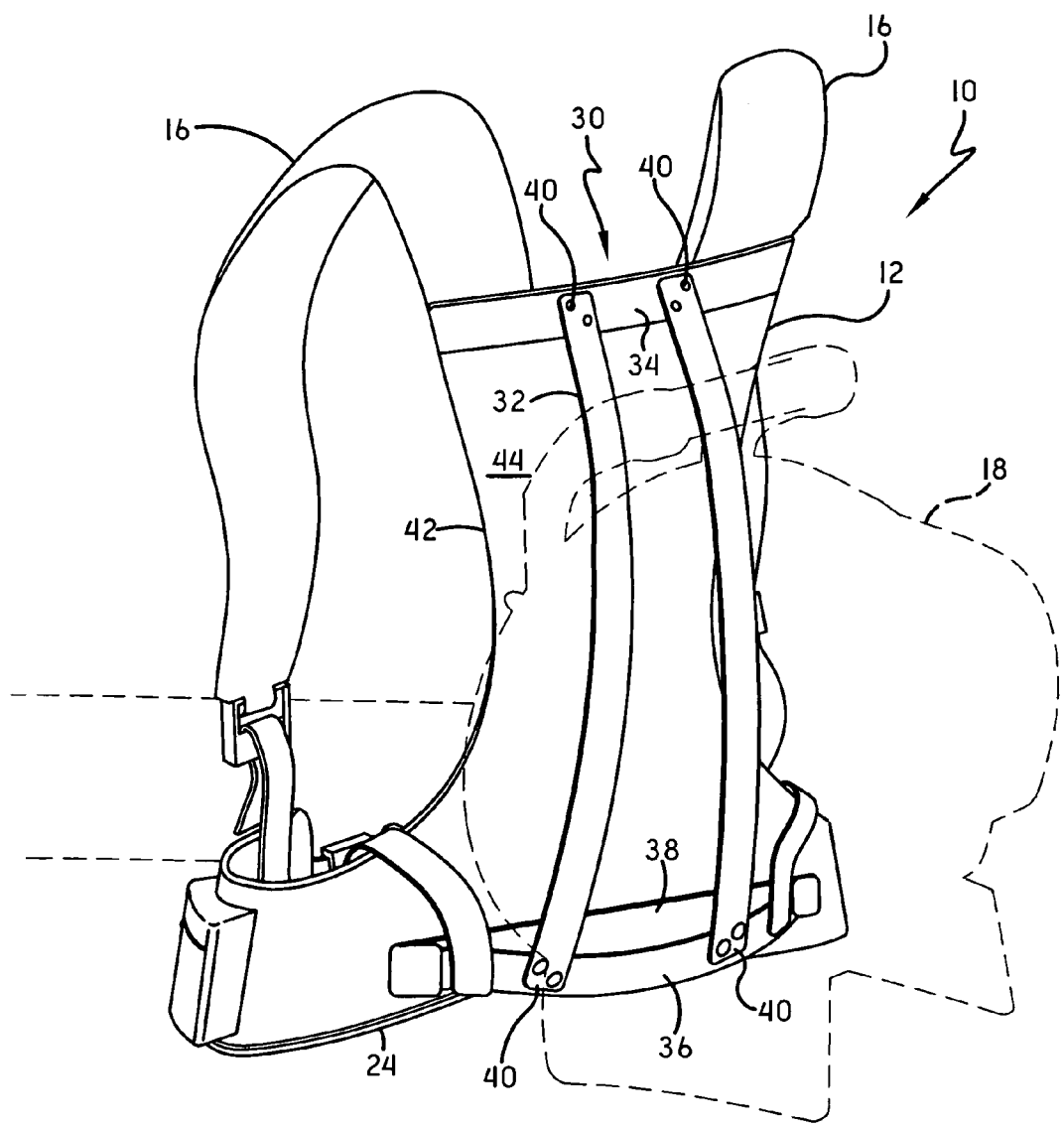
FIG. 2 is a perspective view of the harness of the backpack of FIG. 1 with the housing of the power tool removed for clarity.

Turning now to FIG. 2, the harness 12 has two shoulder straps 16 and a waist belt 24. Desirably, the shoulder straps 16 and waist belt 24 are padded to minimize wearer discomfort. Male and female buckle members 26 are fixed at the two ends of the waist belt 24. Shoulder straps 16 are individually adjusted by means known in the art to mount the blower 10 at the proper height for each operator. Similarly, the waist belt 24 is adjustable so as to fit around the waist of any operator.

The operator places his arms through the shoulder straps 16 and secures the waist belt 24 by connecting the male and female buckle members 26. The shoulder straps 16 and waist belt 24 may then be adjusted to fit the operator.

The harness 12 contains a frame 30 for receiving the housing 18 of the blower 10. Two elongate blower-supporting members 32, broadly tool supporting members, extend from a position near the top of harness 12 proximate the shoulder straps 16 to a position near the bottom of the harness 12 adjacent the waist belt 24. Desirably, the blower-supporting members 32 are elongate bands having a width of between about 0.75 and 2.0 inches (1.9 and 5.1 cm) and a thickness of between 0.10 and 0.30 inches (0.25 and 0.8 cm) and are made of a stiff yet flexible material such as spring steel. Other suitable materials are aluminum, steel, fiberglass, carbon fiber, and the like. The housing 18 is attached to the blower-supporting members 32. Suitable means to attach the housing 18 to the blower-supporting members 32 include the use of screws, rivets, or other fasteners (not shown). Alternately, the blower-mounting members 32 may pass through openings or slots formed in the housing 18. However, one skilled in the art will understand that the housing 18 may be attached by other suitable means selected using sound engineering judgment. Desirably, the power tool housing 18 is mounted to the tool-supporting members 32 via vibration isolation members (not shown), such as a set of four rubber vibration isolators positioned between the vertical members 32 (two on each vertical member) and the housing 18.

In the illustrated embodiment, the top of the blower-supporting members 32 connect to an upper cross member 34 that is also made of a rigid material. The upper cross member 34 extends laterally across a portion of the harness 12 between the shoulder straps 16 such that it lies across the wearer's upper back and shoulders. The lower ends of the blower-supporting members 32 connect to a lower cross member 36 that is also made of a rigid material. The lower cross member 36 also extends laterally across a portion of the harness 12 and has a generally arcuate shape such that the locations to which the blower-supporting members 32 connect are spaced from the waist belt 24 such that there exists a spatial separation between the lower ends of the blower-supporting members 32 and the wearer's back. A second generally flat lower cross member 38 attached to the waist belt 24 may join the arcuate lower cross member 36 to the waist belt 24. The blower-supporting members 32 and the upper cross member 34 and lower cross member 36, 38 are provided with metal rivets, grommets or other suitable fasteners 40 to fasten the components at their junctions. Desirably, the blower-support members 32 are angled slightly such that the distance between the members 32 near the lower cross member 36 is greater than the distance between the members 32 near the upper cross member 34 to aid in the stability of the harness 12.

The expanse between the shoulder straps 16 and the waist belt 24 is bridged by ribbing and/or a fabric layer, broadly a panel 44, which connects the shoulder straps 16 and waist belt 24 and thus the upper and lower cross members 34, 36. In one embodiment, expanse between the shoulder straps 16 and the waist belt 24 is bridged by an air-permeable, open mesh fabric panel 44. Desirably, the frame 30 holds the panel 44 in a substantially constant tension. This panel 44 is adapted to be positioned adjacent the back of a wearer of the blower 10 and desirably permits air circulation thereby reducing overheating and discomfort that otherwise might result from wearing the harness 12. One skilled in the art will recognize that the panel 44 may have variations in its dimension and also have cutout portions without departing from the scope of the invention.

Figure 3:
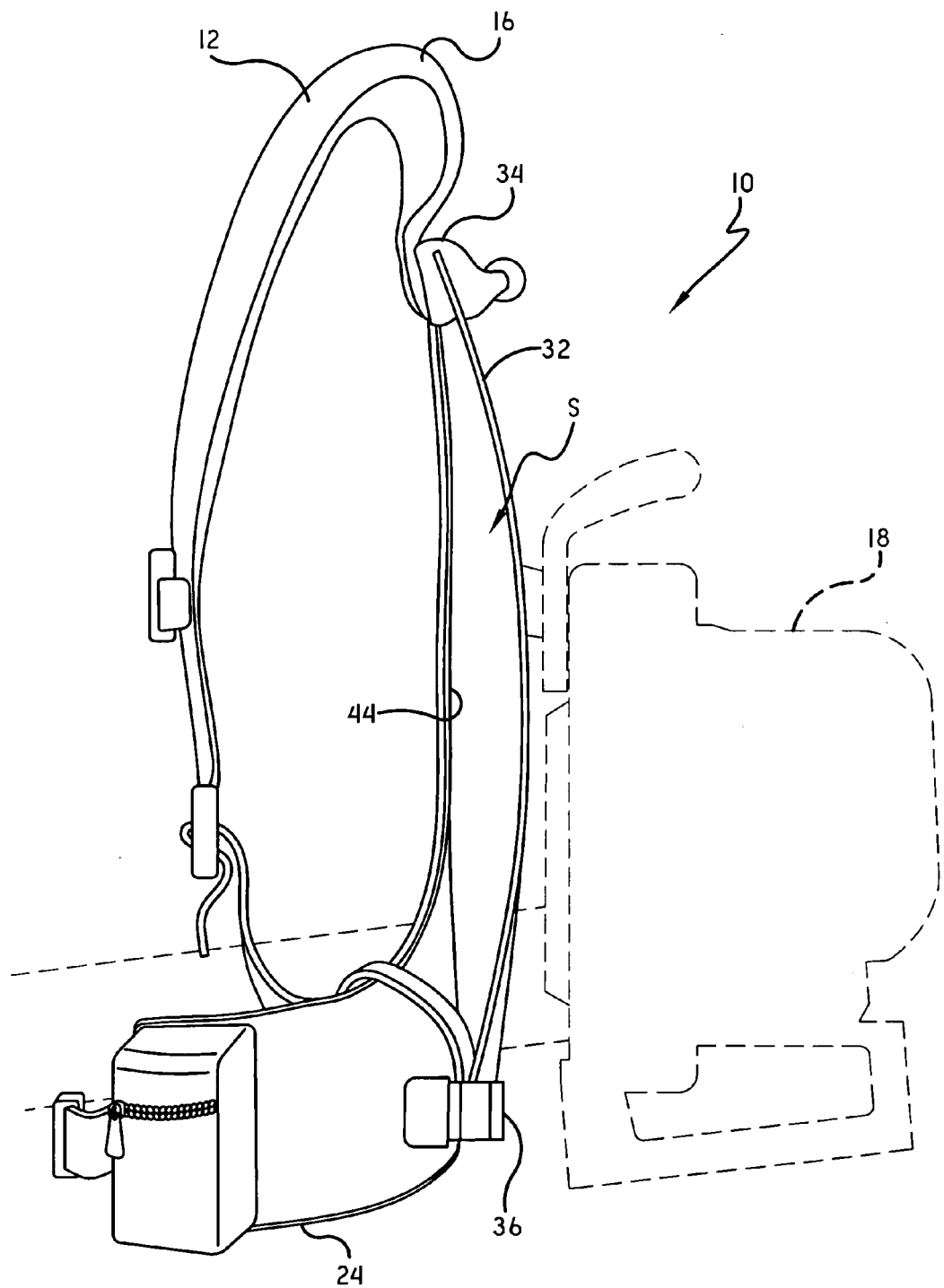
FIG. 3 is side view of the harness of FIG. 2.
Figure 4:
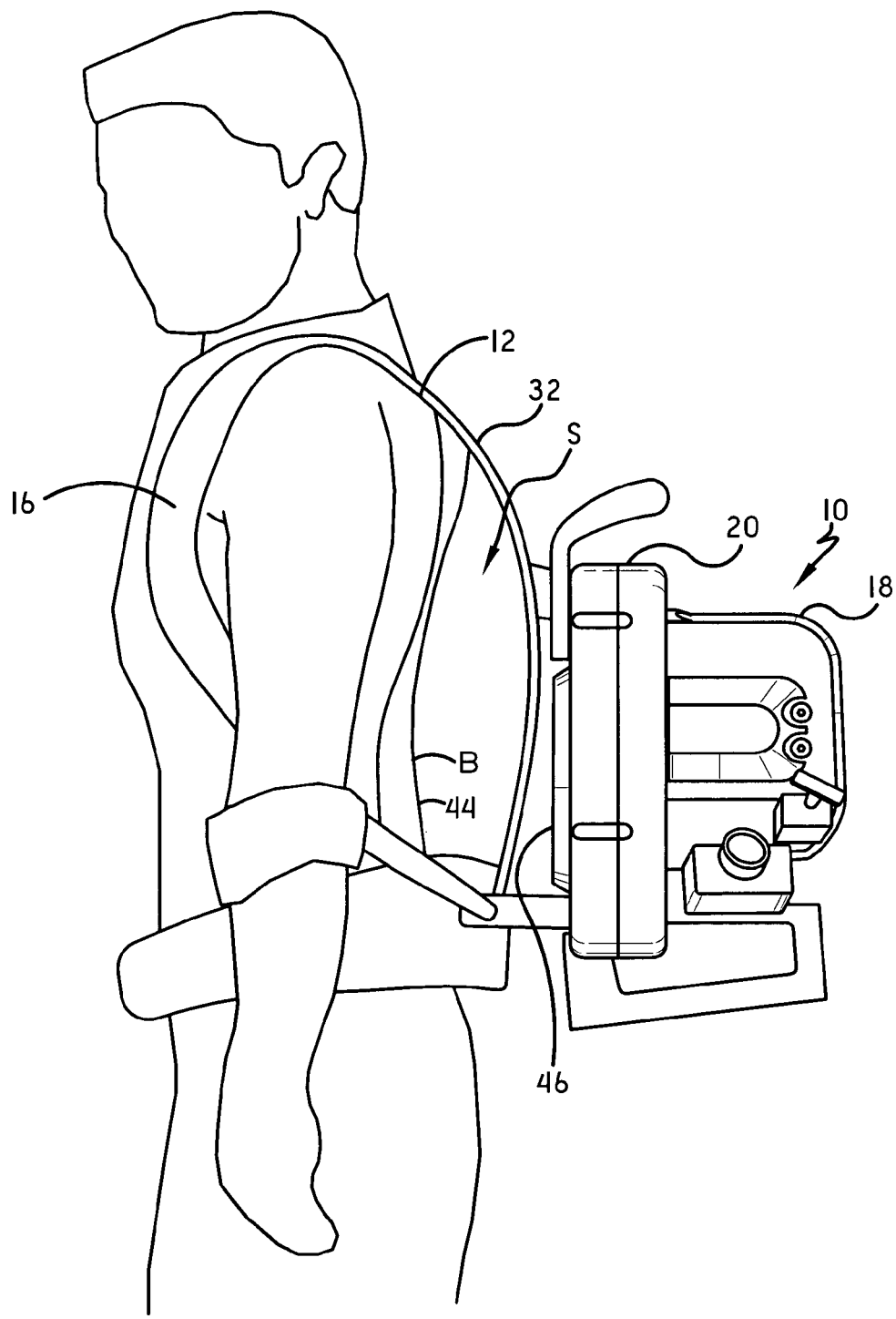
FIG. 4 is view of an operator wearing the backpack mounted power tool of FIG. 1.

As best seen in FIG. 3, it is an important feature of the invention that the blower-supporting members 32 be deformed along their vertical length such that the center portions of the blower-supporting members 32 arc away from the panel 44 and thus the wearer's back. The blower-supporting members 32 are shown as continuously curving arcuate bands, however one skilled in the art will appreciate that bands with a multitude of discrete bends formed therein so that the overall shape of the bands has a substantially arcuate shape are also contemplated and do not depart from the scope of the invention. In one embodiment, a deforming tension force is applied along the length of the blower-supporting members 32 by means of the panel 44 connecting the upper and lower cross members 34, 36. Alternately, the blower-supporting members 32 may be made of a shape-retaining material such that the members 32 are formed having an arcuate shape. When the curvature is thus maintained in the blower-supporting members 32, a zone of spatial separation or air circulation space S is established between the housing 18 and the panel 44 to ensure free air circulation between the blower 10 itself and the wearer's back B as seen in FIG. 4. Desirably, an air intake port 46 in the housing 18 of the blower 10 is positioned facing the air intake space S to increase the circulation of air between the wearer's back B and the housing 18 of the blower 10. Additionally, the air intake port 46 may be positioned in the center of the blower volute 20 such that the suction is taken in between the two blower-supporting members 32. The arcuate blower-supporting members 32 are shaped such that the air intake space S between the housing 18 of the blower 10 and the panel 44 of the harness adjacent the back B of the wearer desirably has a distance of at least about 2.0 inches and more desirably at least 3.0 inches.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A backpack-type power tool configured to be carried on the back of its operator, the power tool comprising:
   a power tool housing at least partially encompassing an internal combustion engine;
   a harness on which the power tool housing is mounted, the harness comprising:
      a pair of shoulder straps;
      a waist strap;
      a panel connecting the shoulder straps and waist strap;
      a frame comprising at least one arcuate tool-supporting member having an upper end proximate the shoulder straps and a lower end proximate the waist strap, said power tool housing being mounted on said tool-supporting member, wherein said tool-supporting member is shaped along its vertical length such that a middle portion of the member arcs away from the panel such that there is an air-circulation space between the power tool housing and the panel, and wherein the frame comprises two elongate tool-supporting members, an upper cross member and a lower cross member, wherein the power tool is mounted on said two tool-supporting members; and
   wherein the power tool is a blower and the housing has an air intake port facing the air-circulation space.

2. The backpack-type power tool of claim 1 wherein the air intake port is positioned such that it takes a suction between the two tool-supporting members.

3. The backpack-type power tool of claim 1 wherein the lower cross member has an arcuate shape.

4. The backpack-type power tool of claim 1 wherein the panel is a mesh fabric material.

5. The backpack-type power tool of claim 4 wherein the frame holds the mesh fabric material in a constant tension.

6. The backpack-type power tool of claim 1 further comprising a vibration isolation member, wherein the power tool housing is mounted to the tool-supporting member via said vibration isolation member.

\* \* \* \* \*